(12) United States Patent　　　(10) Patent No.:　US 12,624,271 B2

Patel et al.　　　(45) Date of Patent:　May 12, 2026

(54) METHODS FOR FREEING DIFFERENTIALLY STUCK PIPES

(71) Applicant: SAUDI ARABIAN OIL COMPANY, Dhahran (SA)

(72) Inventors: Hasmukh A. Patel, Houston, TX (US); Ahmet Atilgan, Houston, TX (US); Nicolas Osorio Labrador, Houston, TX (US); Qusai Darugar, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 161 days.

(21) Appl. No.: 18/747,841

(22) Filed: Jun. 19, 2024

(65) Prior Publication Data

US 2025/0388800 A1　　Dec. 25, 2025

(51) Int. Cl.
| | |
|---|---|
| *C09K 8/05* | (2006.01) |
| *C09K 8/20* | (2006.01) |
| *C09K 8/24* | (2006.01) |
| *E21B 31/00* | (2006.01) |

(52) U.S. Cl.
CPC ............... *C09K 8/05* (2013.01); *C09K 8/206* (2013.01); *C09K 8/24* (2013.01); *E21B 31/035* (2020.05)

(58) Field of Classification Search
CPC .................................................... E21B 33/035
See application file for complete search history.

(56) References Cited

U.S. PATENT DOCUMENTS

| | | | |
|---|---|---|---|
| 6,533,034 | B1 | 3/2003 | Barger |
| 7,784,566 | B2 | 8/2010 | Gregg |
| 8,034,253 | B2 | 10/2011 | Monzyk et al. |
| 8,663,607 | B2 * | 3/2014 | Monzyk .................... A23L 5/57 |
| | | | 510/276 |
| 10,883,038 | B2 | 1/2021 | Ba Geri et al. |
| 11,655,411 | B2 | 5/2023 | Mahmoud |
| 2001/0016561 | A1 * | 8/2001 | Hayatdavoudi ....... E21B 31/035 |
| | | | 507/100 |

(Continued)

FOREIGN PATENT DOCUMENTS

| | | |
|---|---|---|
| CN | 102925128 A | 2/2013 |
| CN | 105462573 A | 4/2016 |
| CN | 112980413 A | 6/2021 |

OTHER PUBLICATIONS

Zhao et al., "Potassium Ferrate (VI) as a Highly Efficient and Environment Friendly Chemiluminescence Reagent in Acidic Solution". Analytical Chemistry, 2019, 91, 19, pp. 12255-12259; acs. analchem.9b02263-. doi: 10.1021/acs.analchem.9b02263.

(Continued)

*Primary Examiner* — William D Hutton, Jr.
*Assistant Examiner* — Avi T Skaist
(74) *Attorney, Agent, or Firm* — Vorys, Sater, Seymour and Pease LLP

(57) ABSTRACT

Methods for freeing differentially stuck pipes may comprise introducing a spotting fluid composition in the vicinity of a portion of a differentially stuck pipe in a well, such that the spotting fluid contacts a material surrounding the portion of the differentially stuck pipe. The spotting fluid may comprise about 0.01 M to about 5 M of an oxidative agent comprising a metal ferrate(VI) and an aqueous solution.

20 Claims, 1 Drawing Sheet

$$4\ K_2FeO_4 + 4\ H_2O \rightarrow 3\ O_2 + 2\ Fe_2O_3 + 8\ KOH$$

Xanthan Gum　　+　　$K_2FeO_4$　　—　　Degraded residues from Xanthan Gum

Potassium Ferrate (VI)

(56) References Cited

U.S. PATENT DOCUMENTS

2008/0314592 A1* 12/2008 Clark ..................... E21B 31/00
                                                  166/301
2021/0115322 A1* 4/2021 Mahmoud ............. C09K 8/536

OTHER PUBLICATIONS

Lee et al., "Kinetics of the Oxidation of Phenols and Phenolic Endocrine Disruptors during Water Treatment with Ferrate (Fe(VI))", Environmental Science & Technology, 2005, 39(22), pp. 8978-8984; doi:10.1021/es051198w.

* cited by examiner $$4\ K_2FeO_4 + 4\ H_2O \rightarrow 3\ O_2 + 2\ Fe_2O_3 + 8\ KOH$$
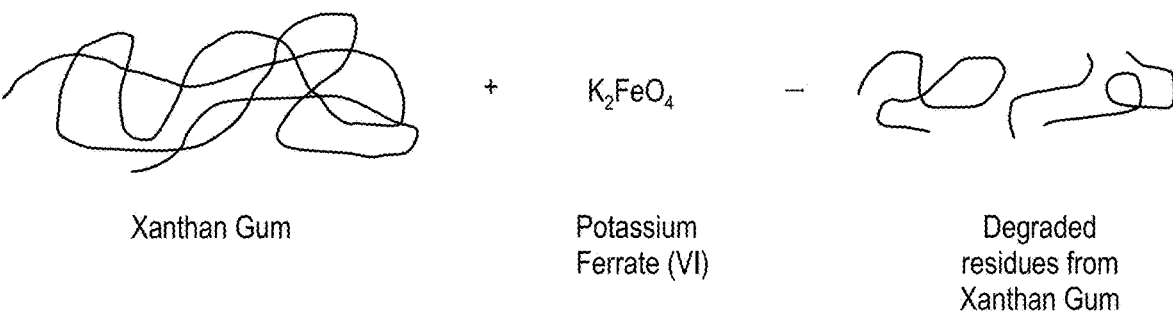
Xanthan Gum      +      $K_2FeO_4$      →      Degraded residues from Xanthan Gum
Potassium Ferrate (VI)
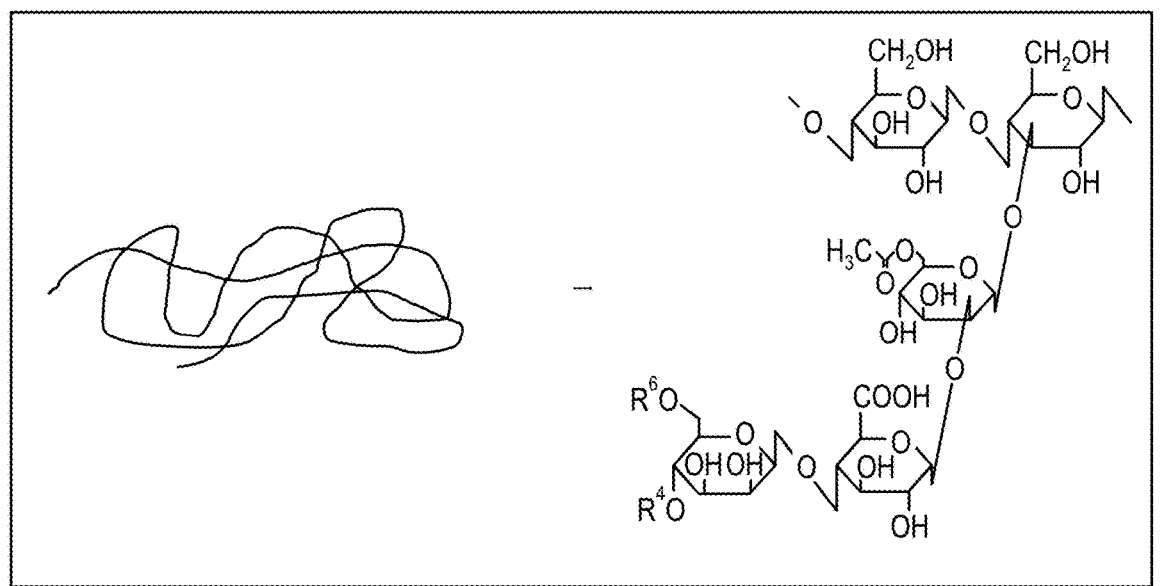

METHODS FOR FREEING DIFFERENTIALLY STUCK PIPES

FIELD OF THE DISCLOSURE

The present disclosure relates generally to downhole treatment fluids and, more particularly, to spotting fluids used to free differentially stuck pipes.

BACKGROUND OF THE DISCLOSURE

Drilling operations are utilized to access and retrieve hydrocarbons from reservoirs within subterranean formations. The process of establishing oil and gas wells is a costly endeavor, with expenses potentially spanning from several million to hundreds of millions of dollars. Delays in the completion of drilling operations, often resulting from instances of stuck pipes, are frequently identified as leading contributors to non-productive time (NPT). Throughout the drilling of oil and gas wells, the tubulars introduced into the well can become lodged in a way that prevents them from rotating or reciprocating. A differentially stuck pipe, which can include drill strings or casings, emerges when a pressure differential across a permeable section of the formation generates a vacuum seal. This seal immobilizes the drill string or another tubular component. In many cases, the deployment of lubricating fluids, dehydrating agents such as anhydrous glycols, and acids, either singularly or in combination, can be employed to dislodge the differentially stuck pipe. Spotting fluid facilitates the release of a stuck pipe by dehydrating the filter cake on the wellbore wall, subsequently inducing cracks in the wellbore wall. This, in turn, alleviates the differential pressure, ensuring the pipe is no longer pressed against the formation.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for freeing differentially stuck pipes may comprise introducing a spotting fluid composition in the vicinity of a portion of a differentially stuck pipe in a well, such that the spotting fluid contacts a material surrounding the portion of the differentially stuck pipe, the spotting fluid composition comprising about 0.01 M to about 5 M of an oxidative agent comprising a metal ferrate(VI) and an aqueous alkaline solution.

In another embodiment, methods for freeing differentially stuck pipes may comprise introducing a spotting fluid composition in the vicinity of a portion of a differentially stuck pipe in a well having a downhole pressure of about 50 psi to about 1,500 psi, such that the spotting fluid contacts a filter cake surrounding the portion of the differentially stuck pipe, the spotting fluid composition comprising about 0.01 M to about 5 M of an oxidative agent comprising potassium ferrate, sodium ferrate, or a combination thereof and an aqueous alkaline solution comprising potassium hydroxide, wherein the spotting fluid has a pH of about 4 to about 11 and is able to withstand a temperature of about 70° F. to about 250° F.; and allowing the spotting fluid composition to interact with the filter cake surrounding the portion of the differentially stuck pipe over a period of time, wherein after the period of time, the spotting fluid composition contributes to a degradation of the filter cake surrounding the portion of the differentially stuck pipe.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

The FIGURE depicts the mechanism of oxidative degradation of xanthan gum by potassium ferrate in an aqueous environment.

DETAILED DESCRIPTION

Embodiments in accordance with the present disclosure generally relate to downhole treatment fluids and, more particularly, to spotting fluids used to free differentially stuck pipes. Differential sticking, characterized by a vacuum-like adherence resulting from pressure disparities between the formation and the wellbore, is a predominant cause of pipe immobilization. Optimal drilling fluids are designed to preclude differential sticking by facilitating the formation of a filter cake. The filter cake acts as a shield segregating the wellbore's contents from the formation. Conventionally, as drilling mud is circulated, the mud traverses down the drill pipe, emerges from the bit nozzles, and circumscribes the drill string. This movement ensures a balanced hydrostatic pressure against the wellbore. However, if the filter cake within the wellbore becomes excessively thick at specific segments, the drill pipe or casing might embed into the cake. Such pressure infuses a fraction of the fluid into the permeable formation, disrupting the uniformity of pressure around the pipe. Consequently, the section of the pipe entrenched in both the filter cake and formation experiences a diminished pressure. This imbalance, coupled with the force exerted by the mud weight, establishes a differential pressure, thereby adhering the pipe.

Common approaches to mitigating differential sticking focus on diminishing the wellbore's hydrostatic pressure to approximate, or even undercut, the formation pressure. This action potentially liberates the pipe. Nevertheless, this option compromises the wellbore's structural integrity, predisposing it to potential mechanical constraints. A more secure remedy to liberate a differentially stuck pipe, without curtailing the hydrostatic pressure, is the deployment of a specialized spotting fluid, which, when administered promptly and proficiently, can mitigate the issue. The preceding few decades have seen the evolution of superior spotting fluids, crafted from poly alpha-olefin invert emulsions. However, subsequent advancements have been limited. The present disclosure details methods for freeing differentially stuck pipes utilizing spotting fluids comprising oxidizing agents, or oxidizers. These oxidizing agents may aid in the degradation of the organic compounds, polymers, or a combination thereof present in the drilling mud or filter cake. Such a spotting fluid may liberate a portion of a differentially stuck pipe by removing or reducing the material (e.g., the filter cake) adjacent to a formation or around the pipe. Moreover, the reaction of the oxidizing agent within the spotting fluid and the drilling mud components may produce heat, further aiding in releasing the immobilized pipe.

In an embodiment, methods for freeing differentially stuck pipes may comprise introducing a spotting fluid composition in the vicinity of a portion of a differentially stuck pipe in a well, such that the spotting fluid contacts a material surrounding the portion of the differentially stuck pipe, the spotting fluid comprising about 0.01 M to about 5 M of an oxidative agent comprising a metal ferrate(VI) and an aqueous alkaline solution.

A non-limiting example method for freeing differentially stuck pipes may comprise introducing a spotting fluid composition in the vicinity of a portion of a differentially stuck pipe in a well having a downhole pressure of about 50 psi to about 1,500 psi, such that the spotting fluid contacts a filter cake surrounding the portion of the differentially stuck pipe, the spotting fluid composition comprising about 0.01 M to about 5 M of an oxidative agent comprising potassium ferrate, sodium ferrate, or a combination thereof; and an aqueous alkaline solution comprising potassium hydroxide; wherein the spotting fluid has a pH of about 4 to about 11 and is able to withstand a temperature of about 70° F. to about 250° F.; and allowing the spotting fluid composition to interact with the filter cake surrounding the portion of the differentially stuck pipe over a period of time, wherein after the period of time, the spotting fluid composition contributes to a degradation of the filter cake surrounding the portion of differentially stuck pipe.

The spotting fluids described in this disclosure may be used to free a differentially stuck pipe by degrading a material (e.g., a mudcake, also referred to as a "filter cake") surrounding a portion of the differentially stuck pipe. This degradation may remove or reduce a seal formed between a formation and the material around the differentially stuck pipe.

The material surrounding the differentially stuck pipe may comprise a filter cake, wherein the filter cake comprises the components of a drilling mud, for example, a water-based mud or a brine-based mud. The drilling mud may comprise a variety of conventional components including, but not limited to, a swellable clay, a polymer viscosifier, a weighting material, a chemical additive, a pH modifier, the like, and any combination thereof. Specifically, the polymer viscosifier may comprise a natural polymer, a synthetic polymer, or a combination thereof. Examples of natural polymers include, but are not limited to, xanthan gum, starch, the like, and any combination thereof. Examples of synthetic polymers include, but are not limited to, acrylamide-based polymers, the like, and any combination thereof.

The spotting fluid may comprise an oxidative agent, such as one or more metal ferrates(VI). Examples of metal ferrates(VI) include, but are not limited to, potassium ferrate, sodium ferrate, the like, and any combination thereof. The oxidative agent in the spotting fluid may contribute to a degradation of the polymeric materials (e.g., a polymer viscosifier) present in the filter cake surrounding the differentially stuck pipe. Ferrates(VI) are strong oxidants that may oxidize both organic and inorganic materials. The degradation of polymers by ferrate(VI) may be attributed to multiple potential pathways. For example, one possible mechanism involves the reduction of ferrate(VI) to ferrate(V) via a radical-generating electron transfer process. This electron transition, involving the transfer of two electrons, may lead to the formation of either radicals or dimers. The radical species produced in the course of this reaction may subsequently engage in reaction with ferrate(VI). Concurrently, Scheme 1 shows the potential for the self-decomposition of ferrate(VI), leading to the formation of ferrate(V), ferrate (IV), and various reactive oxygen species, such as hydrogen peroxide.

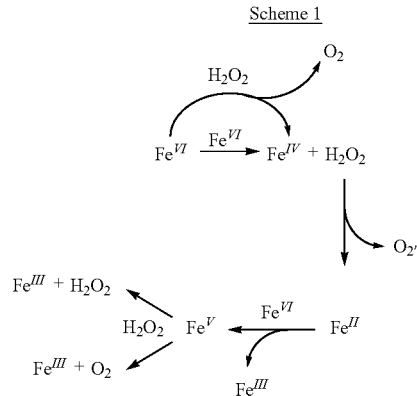

Scheme 1

The presence of these reactive oxygen species may play a role in the mechanism responsible for polymer degradation. An alternative pathway involves the oxidative degradation of polymers by ferrate(VI). The FIGURE shows the mechanism of oxidative degradation of xanthan gum by potassium ferrate in an aqueous environment. Upon the introduction of gaseous oxygen, it is anticipated that long-chain polymers may undergo cleavage, yielding short-chain adducts. Moreover, the decomposition of polymers via ferrate(VI) is an exothermic reaction, and the heat from the reaction may further facilitate the process of freeing differentially stuck pipes.

The spotting fluid composition may have a concentration of the oxidative agent high enough to adequately degrade the filter cake surrounding the differentially stuck pipe. For example, the concentration of the oxidative agent in the spotting fluid composition may be about 0.01 M to about 5 M, or about 0.01 M to about 2 M, or about 0.01 M to about 1 M, or about 0.01 M to about 0.5 M, or about 0.01 M to about 0.1 M, or about 0.1 M to about 5 M, or about 0.1 M to about 2 M, or about 0.1 M to about 1 M, or about 0.1 M to about 0.5 M, or about 0.5 M to about 5 M, or about 0.5 M to about 2 M, or about 0.5 M to about 1 M, or about 1 M to about 5 M, or about 1 M to about 2 M, or about 2 M to about 5 M.

An aqueous alkaline solution may be added to the spotting fluid composition to modify a pH of the spotting fluid composition for an application suitable for drilling operations. The alkaline solution may comprise any suitable basic material including, but not limited to, potassium hydroxide, the like, and any combination thereof. The alkaline solution may modify the pH of the spotting fluid, for example, to about 4 to about 11, or about 4 to about 8, or about 4 to about 6, or about 6 to about 11, or about 6 to about 8, or about 8 to about 11.

The spotting fluid should be able to withstand the geophysical conditions of the well in which the differentially stuck pipe is located. For example, the spotting fluid composition may be able to withstand a temperature of about 70° F. to about 250° F., or about 70° F. to about 200° F., or about 70° F. to about 175° F., or about 70° F. to about 150° F., or about 70° F. to about 100° F., or about 100° F. to about 250° F., or about 100° F. to about 200° F., or about 100° F. to about 175° F., or about 100° F. to about 150° F., or about 150° F. to about 250° F., or about 150° F. to about 200° F., or about 150° F. to about 175° F., or about 175° F. to about 250° F., or about 175° F. to about 200° F., or about 200° F. to about 250° F.

Similarly, the well may, for example, have a downhole pressure of about 50 psi to about 1,500 psi, or about 50 psi to about 1,000 psi, or about 50 psi to about 500 psi, or about 50 psi to about 100 psi, or about 100 psi to about 1,500 psi, or about 100 psi to about 1,000 psi, or about 100 psi to about 500 psi, or about 500 psi to about 1,500 psi, or about 500 psi to about 1,000 psi, or about 1,000 psi to about 1,500 psi.

The spotting fluid composition may be introduced (e.g., by downhole pumping) in the vicinity of a differentially stuck pipe. For example, the spotting fluid composition may be added to a mud system and circulated downhole with the mud.

In any embodiment, the spotting fluid composition may be allowed to soak for a time period. For example, the spotting fluid composition may interact with the material (e.g., the filter cake) surrounding the stuck pipe. After a period of time, the spotting fluid composition may contribute to a degradation of the material surrounding the portion of differentially stuck pipe. The freed pipe may then be recovered, such as by removing the freed pipe from the wellbore. In any embodiment, the spotting fluid composition may not be removed from the mud system after recovering the stuck pipe. Thus, in some embodiments, a process for removing a stuck pipe using the spotting fluid composition may be performed without removing the spotting fluid composition from the mud system.

Embodiments disclosed herein include:

A. A method for freeing differentially stuck pipes, the method comprising: introducing a spotting fluid composition in the vicinity of a portion of a differentially stuck pipe in a well, such that the spotting fluid contacts a material surrounding the portion of the differentially stuck pipe, the spotting fluid composition comprising: about 0.01 M to about 5 M of an oxidative agent comprising a metal ferrate(VI) and an aqueous alkaline solution.

B. A method for freeing differentially stuck pipes, the method comprising: introducing a spotting fluid composition in the vicinity of a portion of a differentially stuck pipe in a well having a downhole pressure of about 50 psi to about 1,500 psi, such that the spotting fluid contacts a filter cake surrounding the portion of the differentially stuck pipe, the spotting fluid composition comprising: about 0.01 M to about 5 M of an oxidative agent comprising potassium ferrate, sodium ferrate, or a combination thereof and an aqueous alkaline solution comprising potassium hydroxide, wherein the spotting fluid has a pH of about 4 to about 11 and is able to withstand a temperature of about 70° F. to about 250° F.; and allowing the spotting fluid composition to interact with the filter cake surrounding the portion of the differentially stuck pipe over a period of time, wherein after the period of time, the spotting fluid composition contributes to a degradation of the filter cake surrounding the portion of the differentially stuck pipe.

Each of embodiments A and B may have one or more of the following additional elements in any combination:

Element 1: wherein the metal ferrate(VI) comprises potassium ferrate, sodium ferrate, or a combination thereof.

Element 2: wherein a pH of the spotting fluid composition is about 4 to about 11.

Element 3: wherein the aqueous alkaline solution comprises potassium hydroxide.

Element 4: wherein the spotting fluid composition is able to withstand a temperature of about 70° F. to about 250° F.

Element 5: wherein a downhole pressure of the well is about 50 psi to about 1,500 psi.

Element 6: the method further comprising allowing the spotting fluid composition to interact with the material surrounding the portion of the differentially stuck pipe over a period of time.

Element 7: wherein after the period of time, the spotting fluid composition contributes to a degradation of the material surrounding the portion of differentially stuck pipe.

Element 8: wherein the material comprises a filter cake, the filter cake comprising a drilling mud.

Element 9: wherein the drilling mud comprises a water-based mud, a brine-based mud, or a combination thereof.

Element 10: wherein the drilling mud comprises a swellable clay, a polymer viscosifier, a weighting material, a chemical additive, a pH modifier, or any combination thereof.

Element 11: wherein the polymer viscosifier comprises a natural polymer, a synthetic polymer, or a combination thereof.

Element 12: wherein the polymer viscosifier comprises a natural polymer, and the natural polymer comprises xanthan gum, starch, or a combination thereof.

Element 13: wherein the polymer viscosifier comprises a synthetic polymer, and the synthetic polymer comprises an acrylamide-based polymer.

By way of non-limiting example, exemplary combinations applicable to A and B include: 1 and 2; 1 and 3; 1 and 4; 1 and 5; 1 and 6; 1 and 8; 2 and 3; 2 and 4; 2 and 5; 2 and 6; 2 and 8; 3 and 4; 3 and 5; 3 and 6; 3 and 8; 4 and 5; 4 and 6; 4 and 8; 5 and 6; 5 and 8; 6 and 7; 6 and 8; 8 and 9; 8 and 10; 8 and 11; 8 and 12; 8 and 13; 9 and 10; 9 and 11; 9 and 12; 9 and 13; 10 and 11; 10 and 12; 10 and 13; 11 and 12; 11 and 13; 1, 2, and 3; 2, 3, and 4; 3, 4, and 5; and 4, 5, and 6.

The present disclosure is further directed to the following non-limiting clauses:

Clause 1. A method comprising:

introducing a spotting fluid composition in the vicinity of a portion of a differentially stuck pipe in a well, such that the spotting fluid contacts a material surrounding the portion of the differentially stuck pipe, the spotting fluid composition comprising:

about 0.01 M to about 5 M of an oxidative agent comprising a metal ferrate(VI); and an aqueous alkaline solution.

Clause 2. The method of clause 1, wherein the metal ferrate comprises potassium ferrate, sodium ferrate, or a combination thereof.

Clause 3. The method of clause 1, wherein a pH of the spotting fluid composition is about 4 to about 11.

Clause 4. The method of clause 1, wherein the aqueous alkaline solution comprises potassium hydroxide.

Clause 5. The method of clause 1, wherein the spotting fluid composition is able to withstand a temperature of about 70° F. to about 250° F.

Clause 6. The method of clause 1, wherein a downhole pressure of the well is about 50 psi to about 1,500 psi.

Clause 7. The method of clause 1, further comprising allowing the spotting fluid composition to interact with the material surrounding the portion of the differentially stuck pipe over a period of time.

Clause 8. The method of clause 7, wherein after the period of time, the spotting fluid composition contributes to a degradation of the material surrounding the portion of differentially stuck pipe.

Clause 9. The method of clause 1, wherein the material comprises a filter cake, the filter cake comprising a drilling mud.

Clause 10. The method of clause 9, wherein the drilling mud comprises a water-based mud, a brine-based mud, or a combination thereof.

Clause 11. The method of clause 9, wherein the drilling mud comprises a swellable clay, a polymer viscosifier, a weighting material, a chemical additive, a pH modifier, or any combination thereof.

Clause 12. The method of clause 11, wherein the polymer viscosifier comprises a natural polymer, a synthetic polymer, or a combination thereof.

Clause 13. The method of clause 12, wherein the polymer viscosifier comprises a natural polymer, and the natural polymer comprises xanthan gum, starch, or a combination thereof.

Clause 14. The method of clause 12, wherein the polymer viscosifier comprises a synthetic polymer, and the synthetic polymer comprises an acrylamide-based polymer.

Clause 15. A method comprising:

introducing a spotting fluid composition in the vicinity of a portion of a differentially stuck pipe in a well having a downhole pressure of about 50 psi to about 1,500 psi, such that the spotting fluid contacts a filter cake surrounding the portion of the differentially stuck pipe, the spotting fluid composition comprising:

about 0.01 M to about 5 M of an oxidative agent comprising potassium ferrate, sodium ferrate, or a combination thereof; and an aqueous alkaline solution comprising potassium hydroxide;

wherein the spotting fluid has a pH of about 4 to about 11 and is able to withstand a temperature of about 70° F. to about 250° F.; and allowing the spotting fluid composition to interact with the filter cake surrounding the portion of the differentially stuck pipe over a period of time, wherein after the period of time, the spotting fluid composition contributes to a degradation of the filter cake surrounding the portion of differentially stuck pipe.

Clause 16. The method of clause 15, wherein the filter cake comprises a drilling mud, the drilling mud comprising a water-based mud, a brine-based mud, or a combination thereof.

Clause 17. The method of clause 16, wherein the drilling mud comprises a swellable clay, a polymer viscosifier, a weighting material, a chemical additive, a pH modifier, or any combination thereof.

Clause 18. The method of clause 17, wherein the polymer viscosifier comprises a natural polymer, a synthetic polymer, or a combination thereof.

Clause 19. The method of clause 18, wherein the polymer viscosifier comprises a natural polymer, and the natural polymer comprises xanthan gum, starch, or a combination thereof.

Clause 20. The method of clause 18, wherein the polymer viscosifier comprises a synthetic polymer, and the synthetic polymer comprises an acrylamide-based polymer.

EXAMPLES

A water-based drilling mud was prepared using conventional techniques. The mud was blended at 11,500 rpm using a multi-mixer, with the components added in the following sequence: tap water (241.5 g) and xanthan gum (0.5 g), followed by a 5-minute shear. Next, bentonite clay (25 g) was added with another 5-minute shear, then caustic soda (1 g) with an additional 5-minute shear, and finally, TANN-THIN™ (1 g, Halliburton) with a 15-minute shear. The mud was then aged at 150° F. for 16 hours.

A spotting fluid of 0.5 M aqueous potassium ferrate was prepared by dissolving 19.8 g of potassium ferrate in 300 mL of distilled water. The solution was made-up to 500 mL using distilled water and the pH was adjusted to between 9 and 10 using a 1 M aqueous potassium hydroxide solution.

A high-temperature high-pressure (HTHP) filter press cell was used to determine the efficacy of the spotting fluid. The filter disks used were either 7/32 inches thick with a pore size of 3 μm to 5 μm or 24/32 inches thick with a pore size of 12 μm. The water-based mud was poured into the HTHP cell, filling the cell to about 75% of the total volume. The cell was closed, pressurized with 100 psi nitrogen gas, and was heated to 150° F. Once the cell reached the desired temperature, the cell was maintained at 150° F. and 100 psi for 30 minutes. The filtrate volume was recorded during this time in two-minute intervals. After measuring the filtrate volume, the cell was allowed to cool to room temperature, and the excess mud was siphoned off, leaving the filter cake inside the cell. The spotting fluid was then poured into the cell, filling the cell to about 75% of the total volume. The cell was closed and pressurized to 300 psi and heated to 150° F. Once heated to the desired temperature, the cell was maintained at these conditions for 16 hours. The filtrate volume was recorded during this time in two-minute intervals while concurrently increasing the pressure in the cell to 500 psi. Following the 16-hour processing time, the cell was cooled to room temperature, and the filter cake was carefully removed from the cell to evaluate the amount of fluid that was released from the filter cake.

For the 7/32 inch thick filter disk, about 30 mL of fluid was released over a period of 16 hours. Similarly, for the 24/32 inch thick filter disk, about 100 mL of fluid was released. Visually, both filter cakes contained multiple cracks after treatment with the spotting fluid. These changes in the physical state of the filter cake and the volumes of released fluid indicate a degradation of the filter cake due to the spotting fluid treatment.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:
   introducing a spotting fluid composition in the vicinity of a portion of a differentially stuck pipe in a well, such that the spotting fluid contacts a material surrounding the portion of the differentially stuck pipe, the spotting fluid composition comprising:
   about 0.01 M to about 5 M of an oxidative agent comprising a metal ferrate(VI); and
   an aqueous alkaline solution.

2. The method of claim 1, wherein the metal ferrate(VI) comprises potassium ferrate, sodium ferrate, or a combination thereof.

3. The method of claim 1, wherein a pH of the spotting fluid composition is about 4 to about 11.

4. The method of claim 1, wherein the aqueous alkaline solution comprises potassium hydroxide.

5. The method of claim 1, wherein the spotting fluid composition is able to withstand a temperature of about 70° F. to about 250° F.

6. The method of claim 1, wherein a downhole pressure of the well is about 50 psi to about 1,500 psi.

7. The method of claim 1, further comprising allowing the spotting fluid composition to interact with the material surrounding the portion of the differentially stuck pipe over a period of time.

8. The method of claim 7, wherein after the period of time, the spotting fluid composition contributes to a degradation of the material surrounding the portion of differentially stuck pipe.

9. The method of claim 1, wherein the material comprises a filter cake, the filter cake comprising a drilling mud.

10. The method of claim 9, wherein the drilling mud comprises a water-based mud, a brine-based mud, or a combination thereof.

11. The method of claim 9, wherein the drilling mud comprises a swellable clay, a polymer viscosifier, a weighting material, a chemical additive, a pH modifier, or any combination thereof.

12. The method of claim 11, wherein the polymer viscosifier comprises a natural polymer, a synthetic polymer, or a combination thereof.

13. The method of claim 12, wherein the polymer viscosifier comprises a natural polymer, and the natural polymer comprises xanthan gum, starch, or a combination thereof.

14. The method of claim 12, wherein the polymer viscosifier comprises a synthetic polymer, and the synthetic polymer comprises an acrylamide-based polymer.

15. A method comprising:
    introducing a spotting fluid composition in the vicinity of a portion of a differentially stuck pipe in a well having a downhole pressure of about 50 psi to about 1,500 psi, such that the spotting fluid contacts a filter cake surrounding the portion of the differentially stuck pipe, the spotting fluid composition comprising:

about 0.01 M to about 5 M of an oxidative agent comprising potassium ferrate, sodium ferrate, or a combination thereof; and an aqueous alkaline solution comprising potassium hydroxide;

wherein the spotting fluid has a pH of about 4 to about 11 and is able to withstand a temperature of about 70° F. to about 250° F.; and allowing the spotting fluid composition to interact with the filter cake surrounding the portion of the differentially stuck pipe over a period of time, wherein after the period of time, the spotting fluid composition contributes to a degradation of the filter cake surrounding the portion of differentially stuck pipe.

16. The method of claim 15, wherein the filter cake comprises a drilling mud, the drilling mud comprising a water-based mud, a brine-based mud, or a combination thereof.

17. The method of claim 16, wherein the drilling mud comprises a swellable clay, a polymer viscosifier, a weighting material, a chemical additive, a pH modifier, or any combination thereof.

18. The method of claim 17, wherein the polymer viscosifier comprises a natural polymer, a synthetic polymer, or a combination thereof.

19. The method of claim 18, wherein the polymer viscosifier comprises a natural polymer, and the natural polymer comprises xanthan gum, starch, or a combination thereof.

20. The method of claim 18, wherein the polymer viscosifier comprises a synthetic polymer, and the synthetic polymer comprises an acrylamide-based polymer.

\* \* \* \* \*